June 30, 1925.  1,543,678

L. G. MERRITT

POWER TRANSMISSION FOR VENEER LATHES

Original Filed April 25, 1922   5 Sheets-Sheet 1

INVENTOR
Louis G. Merritt
BY
Duell, Warfield & Duell
ATTORNEY

June 30, 1925. 1,543,678
L. G. MERRITT
POWER TRANSMISSION FOR VENEER LATHES
Original Filed April 25, 1922 5 Sheets-Sheet 3

INVENTOR
Louis G. Merritt,
BY
Duell, Warfield & Duell
ATTORNEY

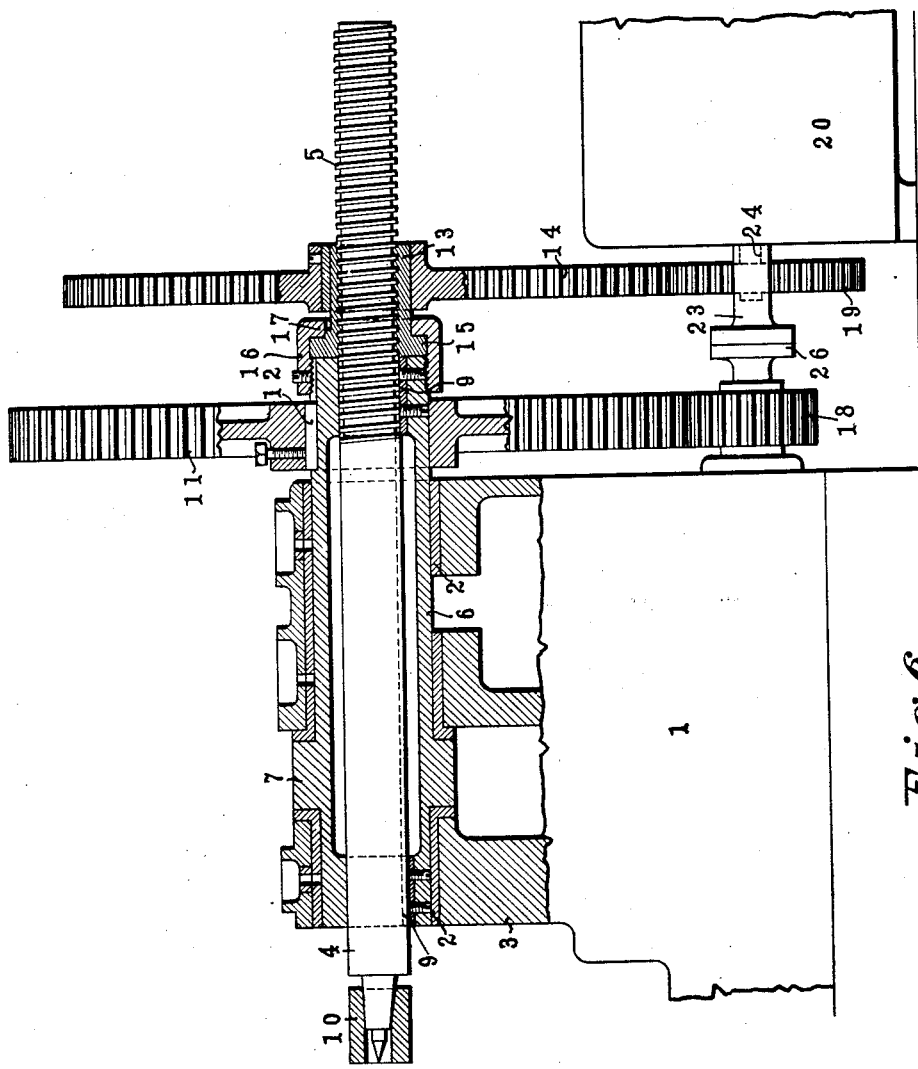

June 30, 1925.
L. G. MERRITT
1,543,678
POWER TRANSMISSION FOR VENEER LATHES
Original Filed April 25, 1922   5 Sheets-Sheet 5
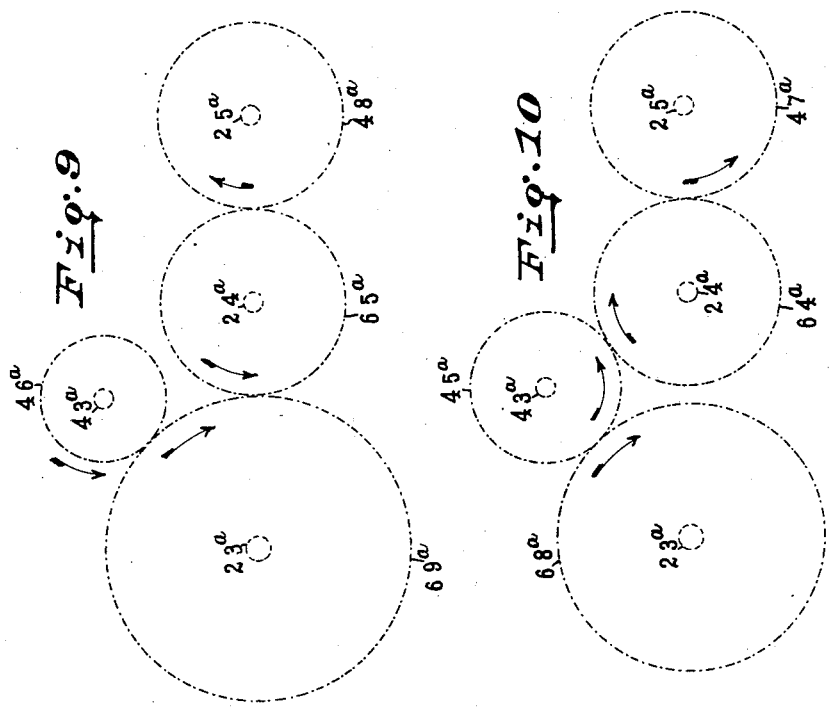
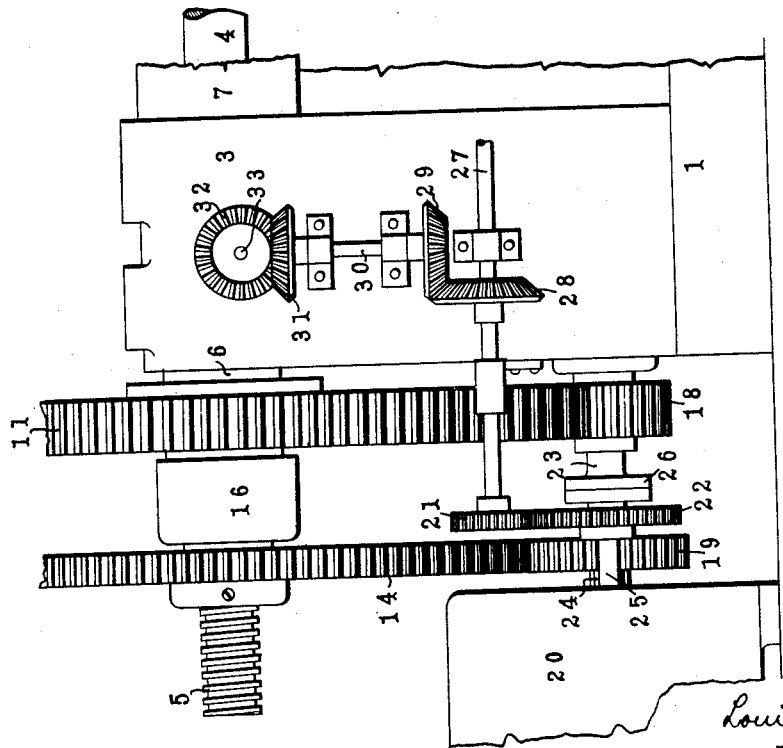
INVENTOR
Louis G. Merritt,
BY
Duell, Warfield & Duell.
ATTORNEY Patented June 30, 1925.

1,543,678

UNITED STATES PATENT OFFICE.

LOUIS G. MERRITT, OF LOCKPORT, NEW YORK.

POWER TRANSMISSION FOR VENEER LATHES.

Application filed April 25, 1922, Serial No. 556,511. Renewed January 8, 1925.

*To all whom it may concern:*

Be it known that I, LOUIS G. MERRITT, a citizen of the United States, residing at Lockport, in the county of Niagara and State of New York, have invented certain new and useful Improvements in Power Transmission for Veneer Lathes, of which the following is a full, clear, and exact description, such as will enable others skilled in the art to which it appertains to make and use the same.

This invention relates to improvements in power transmission mechanism, and particularly to a power transmission gear-box for transmitting different character of movements to the various operative elements of veneer lathes.

It is the general object of the invention to improve and simplify the power transmission connections for supplying power to the operative elements of veneer lathes or the like.

Another object of the invention is the provision of an improved power transmission unit of simple and compact design which is reliable and durable in operation and comparatively inexpensive to manufacture.

Still another object is to provide an improved power transmission of unitary construction, designed for transmitting varying movements to the respective operative parts of a veneer lathe, and which is controlled with facility by an operator, and susceptible of ready installation.

Another object is to provide a veneer lathe with improved driving connections arranged for co-operation with unitary power transmission mechanism, simplifying driving connections and rendering control of the lathe simple and efficient.

For a complete understandng of the nature and advantages of the invention reference should be had to the accompanying drawings and detailed description setting forth the best illustrative embodiments at present known. In said drawings, Figure 1 is a top plan view of an improved power transmission unit or gear-box, parts being broken away to disclose more clearly the details of construction;

Fig. 6 is a fragmentary elevation, parts being shown in vertical section, of a veneer lathe showing the application of the power transmission unit thereto;

Fig. 7 is a fragmentary sectional elevation showing the application of the power transmission unit to the operative elements of the veneer lathe;

Fig. 8 is a fragmentary elevational view of the veneer lathe and operative elements therefor; and Figs. 9 and 10 are diagrammatic views showing a modified arrangement of the gears of the power transmission unit.

Figure 1:
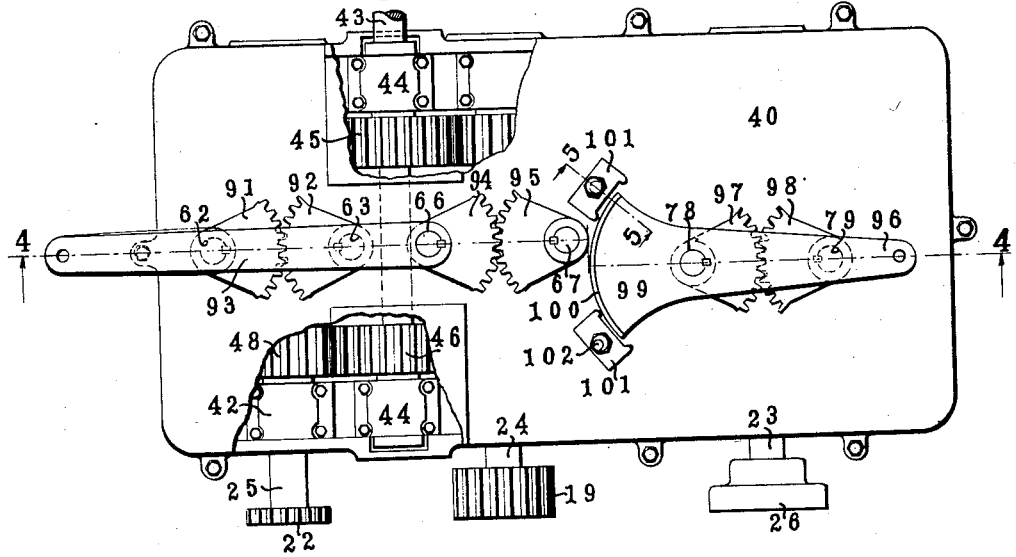

Referring now to the drawings for a detailed description of the construction there shown, and first to Figs. 6, 7 and 8, fragmentary views of a bed 1 of a veneer lathe appear. Supported in bearings 2 in the standard 3 of the lathe-bed is the head chuck spindle 4 threaded at one end as at 5. This spindle is mounted in a cylindrical sleeve 6 rotatably supported in bearing 2 and provided with an annular integral collar 7 engaging with a seat in the bearing to receive end thrusts. Sleeve 6 has a central longitudinal opening receiving the head spindle, the latter being formed with a longitudinal spline for receiving keys or lugs 9 on the spindle sleeve, so these parts are compelled to rotate together, but longitudinal sliding movement of the spindle relatively to the sleeve is permitted. The forward end of the spindle is fitted with a dog 10 adapted to be embedded in the end of the log or similar stock, on which the lathe is adapted to operate, for supporting the same in position. It will be understood that the opposite end of the log is supported also by a similar dog mounted on a spaced spindle in axial alignment with spindle 4 in a manner understood by those skilled in the art. This arrangement of dogging or chucking mechanism, and the general assembly of a lathe of the character herein referred to, are shown in Patent No. 699,547 issued to L. G. Merritt on May 6, 1902, to which reference is made for a more complete disclosure of the general construction and assembly of a machine of this nature.

The outer end of the spindle sleeve 6 carries a main log-driving gear 11 rigidly secured thereon by a key 12. An internally threaded nut 13 engages the threaded end of the spindle 4, and keyed thereon for rotation therewith is a toothed driving gear 14 by which power is adapted to be transmitted to the spindle for power chucking. Nut 13 is provided with an integral annular flange 15 and is rotatably secured to the outer end of the spindle sleeve 6 by a cap 16 threaded to the end of said sleeve and having an internal flange 17 engaging the outer face of annular flange 16. By this arrangement the nut is secured against relative longitudinal movement with respect to the spindle sleeve, while the spindle itself may be given longitudinal movement independently of the sleeve by rotation of the nut which movement is permitted with respect to said sleeve by the construction described.

The log driving gear 11 and power chuck gear 14, by the concentric mounting on the same axis as above described, are brought into juxtaposition in convenient positions to co-operate respectively with driving gears 18 and 19 connected to driving shafts extending from a unitary power transmission unit or gear-box indicated generally by reference 20.

As disclosed also by said prior Patent No. 699,547, the veneer lathe to which the improved power transmission unit is applied, is preferably fitted with a quick forward and backward feed mechanism for the knife carriage; the purpose of this feed mechanism is to give the carriage an independent quick forward and reverse movement to advance the knife to the cutting position at the beginning of the cutting, and to withdraw the same at the finish into position for the machine to receive a fresh log. The driving connection or gear 21 for this mechanism is mounted on the feed-drive shaft 27 extending longitudinally of the lathe and mounted in suitable bearings thereon. This gear is arranged in juxtaposition to the driving gears 11 and 14, and in position to mesh with a driving gear 22 carried by the power transmission unit. It will therefore be seen that the operating gears 11, 14 and 21 of the lathe are grouped together in close relationship to each other for convenient co-operation with the driving gears of the power transmission unit. The driving shafts 23, 24 and 25 are connected respectively to gears 18, 19 and 22 and are mounted in the gear-box and arranged to be selectively operated thereby to transmit different movements to the operative elements of the lathe, as will be more fully pointed out later on.

When different sizes or capacities of lathes are employed, the toothed gears 21 and 22 may be replaced by sprocket wheels, and the driving transmission to the knife carriage effected by a driving sprocket chain. With such an arrangement the log-driving and power-chucking gears may be uniformly arranged and spaced apart in a standard manner in different sizes of lathes, while the spacing and arrangement of the gear 21 with respect to the other driving gears may vary. In this manner it is possible to make up a power transmission gear-box which is adapted for ready application to lathes of different capacity or character, all that is necessary for adaptation to different machines being to furnish driving sprocket-chains of the required dimensions. Ordinarily, however, two sizes of gear-box equipped with toothed driving gears as shown are able to take care of veneer lathes of all standard capacities. In order to adapt the log-driving gear 18 for connection to the lathe, a shaft coupling 26 may be employed to connect said gear to the driving shaft 23 of the gear-box.

The quick forward and return movement of the knife carriage may be of any approved design, for example, such as that shown in said prior Patent No. 699,547. The feed drive pinion 21 is mounted on the main feed shaft 27 as in the construction of said patent. Beveled gears are mounted on the shaft 27, one being indicated at 28, and each meshing with a similar gear 29 on an upright shaft 30. This upright shaft carries at its upper end a second beveled gear 31 meshing with beveled gear 32 mounted on a shaft or feed screw 33. The latter is preferably threaded to the knife carriage as in said prior patent. A clutch mechanism (not shown) may be provided in shaft 27 between gears 21 and 28 for cutting off movement between these gears during normal feeding movement of the knife, in its cutting operation. The normal feeding is transmitted to shaft 27 by separate driving mechanism, such e. g. as shown in said prior patent.

As above mentioned, it is desirable to impart to the lathe knife a rapid backward and forward movement; it is also desirable to impart forward and backward movement to the power dogging mechanism, and to impart two rotative speeds in one direction to the log-driving spindle so the cutting speed of the knife may be equalized, or partially equalized, throughout the process of cutting from starting when the log is relatively large, to the finish when the log is small. When the log is full size a slow rotative speed is imparted thereto, but as it is cut away and reduced in diameter the rotative speed is increased, enabling the cutting to be done more quickly without forcing the machine beyond its capacity, the work being equalized throughout the cutting operation. These varying movements of the various operative elements of the lathe are accomplished through the driving connections above described, when coupled with the transmission forming the subject matter of the present application.

The power transmission unit or gear-box for accomplishing the above enumerated function comprises a cast metal housing or casing suitably ribbed for strengthening and divided horizontally into upper and lower sections or halves 40 and 41, having complementary tightly engaging surfaces, the sections being secured together by screw-bolts or the like. The shafts 23, 24, and 24 extend transversely of the housing being mounted in bearing 42 supported by the walls of the lower section and extending beyond the housing at one side thereof for connections to the operating elements of the lathe. The main driving shaft 43 for the gear-box is positioned at a higher plane than the other shafts, being arranged parallel to the latter and supported in bearings 44 carried by pedestals or supports secured to or formed integrally with the lower section and extending above the dividing line between the sections. The driving motor may be direct-connected to the projecting end of the driving shaft 43 on the inside of the casing opposite to the lathe, or power may be otherwise delivered to said shaft. The driving shaft 43 carries spaced driving gears 45 and 46 rigidly keyed thereto and forming elements of two trains of gears arranged at opposite sides of the housing.

Mounted on the shaft 25 so as to rotate freely independently thereof, are gears 47 and 48 which may be termed "clutch gears", since they are formed with female conical clutch seats 49 and 50 respectively facing toward each other, the gear teeth being formed on the external surface as clearly shown in the drawing. Each gear is provided with a bearing hub 51 and 52, and is supported on an anti-friction bearing sleeve 53 interposed therebetween and the shaft 25. Intermediate its ends shaft 25 is formed with an integral enlargement 54, forming at its opposite ends abutments for the bearing hubs 51 and 52 and bushings 53. The external diameter of these enlargements is approximately the same as that of the adjacent end portions of the respective hubs, and together these parts form a seat for receiving a clutch sleeve or hub 55. This sleeve is provided with an internal bore about equal in diameter to that of the enlargement 54 to which it is secured for rotation with the shaft by a key 57, but is permitted longitudinal sliding movement on its seat with respect to the clutch gears.

At its opposite extremities, sleeve 55 is provided with male clutch members 58 and 59 having external conical surfaces adapted for frictional engagement with the respective female clutch members. The clutch sleeve or hub 55 is provided with an encircling channel intermediate its ends, in which runs freely a two-part clutch-operating ring 60. The parts of this ring are secured together by bolts 56 extending through lugs 56′ formed thereon. The ring is provided with diametrically opposed elongated lugs 61 positioned for meshing with grooves milled longitudinally, in clutch-operating stems 62 and 63, which may conveniently be termed "lever segment stems". The arrangement described provides selective mechanism whereby the clutch may be engaged for driving the shaft 25 from clutch-gear 47 or from clutch-gear 48, or the clutch sleeve may assume an intermediate position when both clutch gears run idly on the shaft, the latter then remaining inoperative.

A driving shaft 24 is provided with clutch gears 64 and 65, and is similar in construction to the clutch gears above described, and are mounted on the shaft in a similar manner, as will be clear from the drawings. A clutch sleeve 55 is also provided for this shaft, and the arrangement of clutch gears and clutch sleeve is similar to that above described, and the parts are correspondingly numbered. Further detailed description of this construction will therefore be unnecessary for a clear understanding. Lever segment stems 66 and 67 are also provided for operating this clutch sleeve in a manner similar to that for operating the clutch sleeve already described.

Shaft 23, being the main driving shaft for the log spindle 4, is likewise provided with gears 68 and 69 mounted for free rotative movement thereon, and with clutch mechanisms similar to that above described. In this case, however, the female clutch member 70 is formed as a separate part, while clutch gear 69 is formed with a female clutch seat as in the case of the clutch gears previously described. Clutch member 70 has a hub 71 for receiving the gear 68 to which the latter is secured by a key 72 and this hub is rotatably mounted on the shaft by anti-friction bushing 73. The mounting of the clutch gear 69 on the shaft is similar to that already described for clutch gears 47 and 48, and the mounting of the clutch sleeve 74 and the operative means therefor are similar to those for clutch sleeve 55, and clearly appears in Fig. 3 of the drawing. The male conical clutch heads 75 and 76 are arranged for frictional engagement respectively with the female clutch members 70 and 69 and lever segment stems 78 and 79 are arranged for co-operation with the lug 61 of clutch ring 60.

Figure 2:
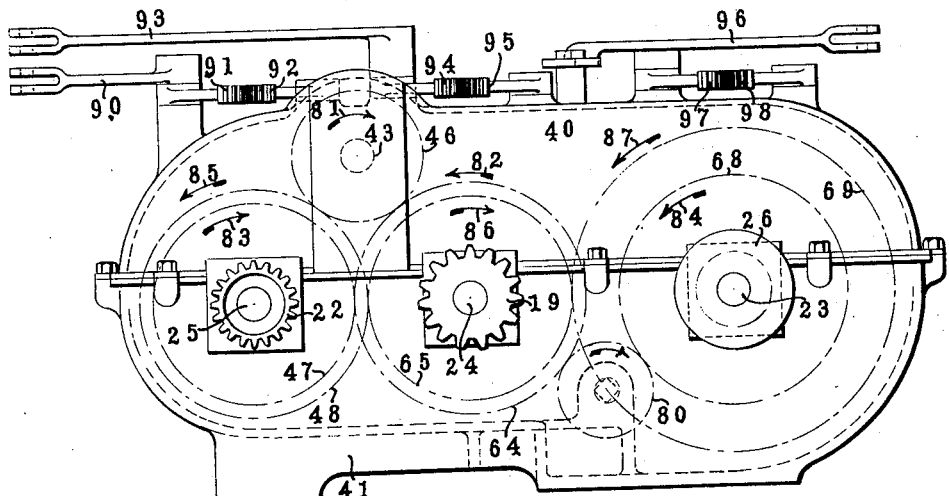
Fig. 2 is a side elevation thereof, indicating also diagrammatically the relative positions of the internal gears.
Figure 5:
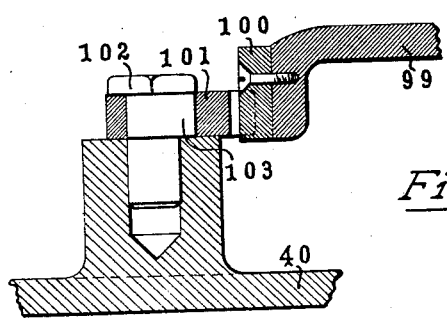
Fig. 5 is an enlarged fragmentary section taken approximately on line 5—5 of Fig. 1.
Figure 3:
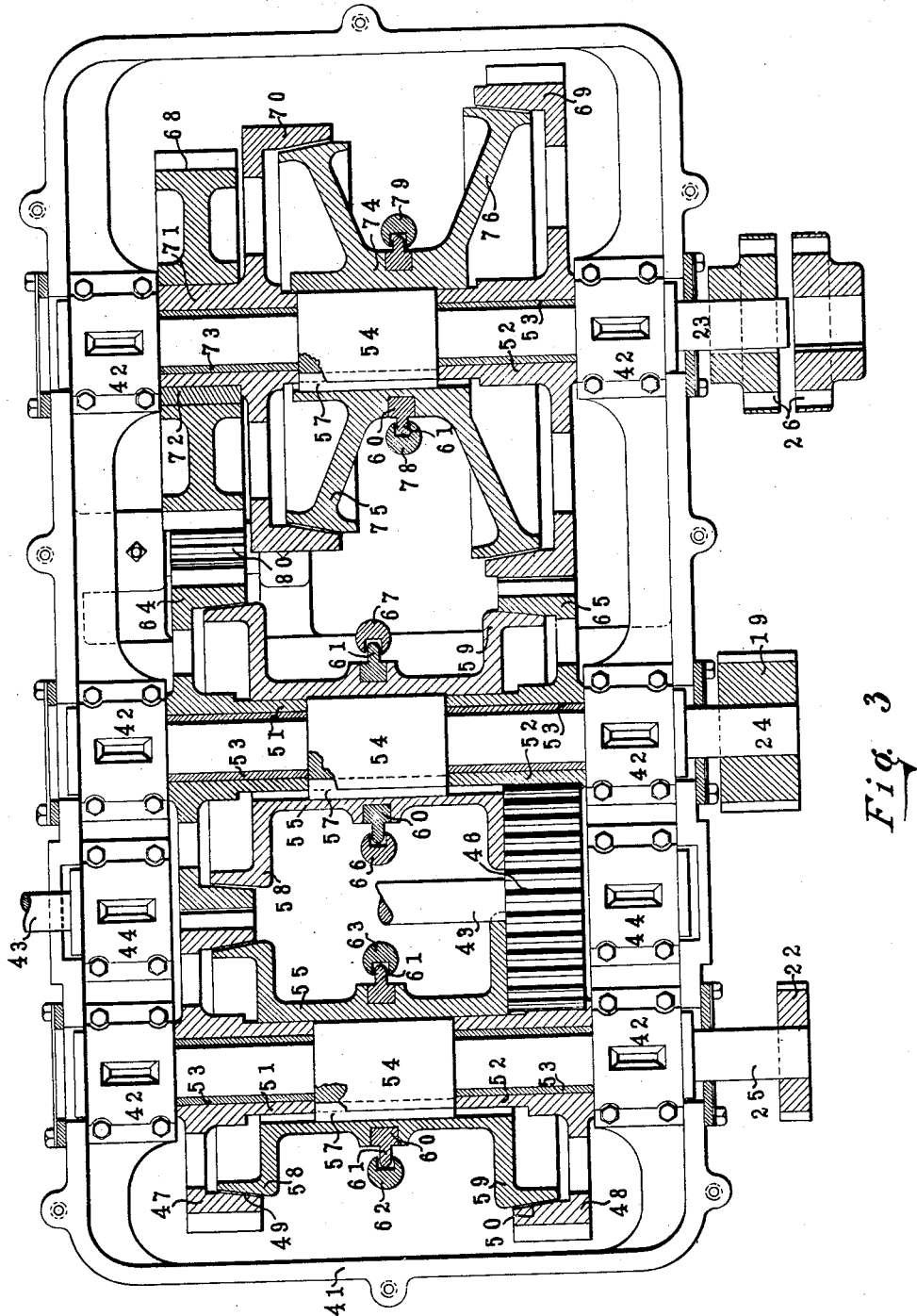
Fig. 3 is an enlarged top plan view of the lower section of the gear-box, parts being shown in section and still other parts being shown in fragmentary manner.
Figure 4:
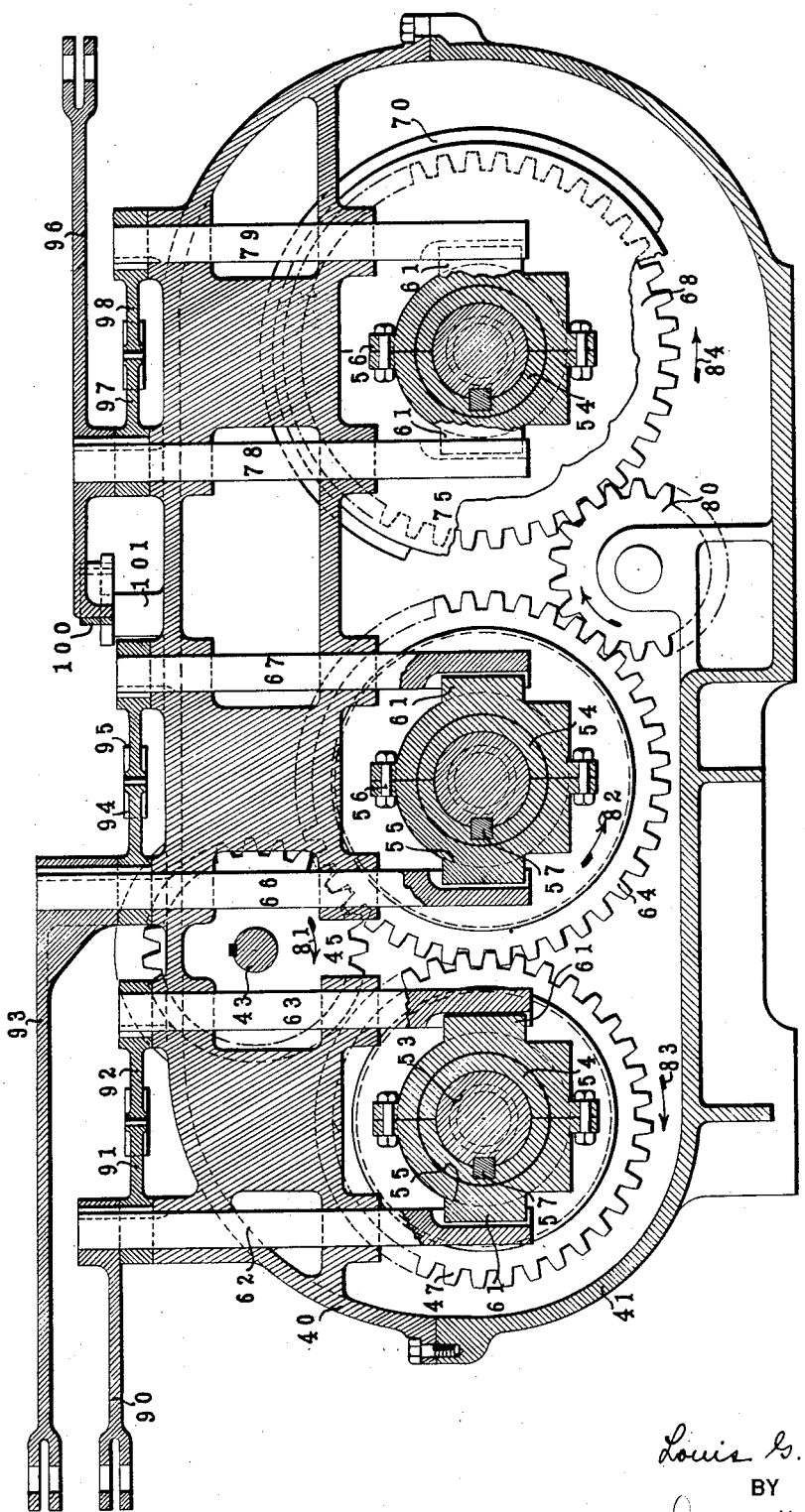
Fig. 4 is a vertical longitudinal section taken approximately on the line 4—4 of Fig. 1, looking in the direction of the arrows.

As shown in Figs. 3 and 4 an idler pinion 80 is mounted upon suitable supports on the lower section of the casing and is in mesh respectively with gears 68 and 64. As seen also more clearly in Figs. 2 and 4, driving pinion 45 meshes with gear 64 of the dog driving shaft 24, and gear 64 meshes with gear 47 of the quick forward and backward driving shaft 25. These gears constitute the gear train at one side of the gear-box.

As shown in Fig. 3, and diagrammatically in Fig. 2, the driving pinion 46, and the gears 48, 65 and 69, respectively positioned on shafts 25, 24 and 23 constitute the gear train at the opposite side of the gear-box. In this train the driving pinion 46 meshes with gear 48, gear 48 with gear 65 and gear 65 with gear 69 on the log driving shaft 23. It will be understood that the gears are relatively proportioned to drive the respective operative elements of the lathe at the desired speeds when the driving shaft 43 is operated at normal speed.

It will now be obvious that when the main driving shaft 43 is operated in the direction indicated by the arrow 81 in Figs. 2 and 4, driving pinion 45 will drive gears 64, 47 and 68 in directions indicated by the arrows 82, 83 and 84 respectively. At the same time the driving gear 46 will drive gears 48, 65 and 69 respectively in the directions indicated by the arrows 85, 86 and 87. It will therefore be seen that gears 47 and 48 for the quick forward and backward driving shaft 25 rotate in opposite directions, gears 64 and 65 on the dog driving shaft 24 rotate in opposite directions, while the gears 68 and 69 on the log driving shaft 23 rotate in the same direction but at different speeds due to difference in relative diameters of the gears, gear 68 traveling at a greater rotative speed than gear 69. In the arrangement shown there will also be a slight difference in the reverse rotative speeds of gears 47 and 48, and in the reverse rotative speeds of gears 64 and 65, but this inequality will not be great as the difference in relative diameters of these gears is small. By the selective arrangement of clutches above described it will be seen that shafts 25 and 24 may be given reverse rotative movements, while shaft 23 may be given rotative movement at different speeds in the same direction, and the different operative elements of the lathes may be given corresponding movements to accomplish the various functions described.

It will be understood that the gear casing is made with tight joints and the gears run in an oil bath which not only lubricates the bearings and gears, prolonging their life, but also reduces noise to a minimum. A second speed for the log drive of the lathe is provided with little or no extra expenses and construction, while belts and other troublesome parts are eliminated. It will be observed that this transmission unit displaces the separate driving connections to the various operative lathe elements, such as belts, separate motors mounted on various parts of the lathe, etc., common in the prior art, greatly simplifying the construction, lessening the number of operative parts, and resulting in an arrangement requiring little attention and capable of operation with great facility as compared with prior driving devices. Also the arrangement is compact, requiring less installation space than old devices and less power to drive, at the same time being cheaper in production cost and maintenance.

Mechanism for controlling the clutches for selective connection with the respective gears is shown best in Figs. 1, 2 and 4. As indicated the lever segment stems 62, 63, etc., are rotatably mounted in operative positions in parallel pairs in the upper section of the housing in suitable bearings formed therein. The stem 62 is fitted at its external extremity with an operating lever 90 and with a toothed segment 91 keyed thereto, the latter meshing with a similar segment 92 keyed to the stem 63, the two segments being by this means constrained to rotate in unison but in opposite directions imparting longitudinal thrust movement upon the clutch hub or sleeve 55 in one direction or the other, depending upon the direction of operation of the lever 90, and setting the clutch at one end or the other of the clutch sleeve.

Stems 66 and 67 are provided with similar operating means including a lever 93, and intermeshing segments 94 and 95 keyed to the respective stems. Likewise an operating lever 96 is keyed to the stem 78 and segments 97 and 98 are keyed to the respective stems compelling them to rotate in unison. Suitable operating connections (not shown) extend from these clutch levers to the machine operating levers positioned for convenient access by an operator who controls the various operations of the lathe.

The operating lever 96 for the main log driving clutch is provided with a locking arrangement to hold the clutch in any position to which it may be moved by the operator. For this purpose a segmental extension 99 opposite the lever arm has a face concentric with the pivotal mounting of the lever to which face a steel locking lever contact 100 is secured. Two plates or lock lever jams 101 are secured to the casing by pins 102 having eccentric portions 103 engaging circular openings in the lock lever jams. These jams are arranged in juxtaposition to the face presented by the contact plate 100 and may be adjusted as desired by means of the jam pivot pins 102 for co-operation with said face to lock the lever in desired position.

The operation of the device is fully embodied in the above detailed description and will be clear to those skilled in the art without recapitulation.

Figs. 9 and 10 indicate diagrammatically a modified arrangement of the gears of the two gear trains, Fig. 9 representing the train at one side of the gear box for low speed drive of the log driving shaft, and Fig. 10 representing the opposite train for high speed drive. The figures represent the two trains viewed from the same side of the gear-box, and the respective gears are designated by the same reference numerals as employed above to designate corresponding parts of the first embodiment, but with the application of the index "a".

As in the case above set forth, the main log driving gears 68ª 69ª are mounted for free rotation on the main log driving shaft 23ª and the gears 64ª, 65ª, and 47ª, 48ª are similarly mounted respectively upon the clutch driving shaft 24ª and the shaft 25ª for driving the quick forward and backward feed mechanism for the knife carriage. In this case as before, the driving pinions 45ª and 46ª are keyed to the driving shaft 43ª which is in this case mounted in the casing so its driving pinions mesh directly with the gears of the main log driving shaft 23ª. The intermeshing arrangement of the gears of the two trains is clearly shown in the drawing. The driving pinion 45ª is somewhat larger than its companion pinion 46ª and gear 68ª is smaller than 69ª. Pinion 45ª meshes directly with gear 68ª and pinion 46ª meshes directly with gear 69ª. As shown in Fig. 10 pinion 45ª meshes also with gear 64ª, and gear 64ª with gear 47ª. Also as seen in Fig. 9 gear 69ª meshes with gear 65ª, and gear 65ª with gear 48ª.

It is therefore clear that when the driving shaft and pinions 45ª and 46ª are rotated in the direction indicated by the arrows, the log driving gears 68ª and 69ª both rotate in the same direction, as indicated by the arrows but at different speeds; gears 64ª and 65ª on the chucking shaft 24ª rotate in opposite directions as indicated by the arrows; while gears 47ª and 48ª on the shaft 25 for driving the knife carriage rotate in opposite directions, as indicated. The clutch arrangement for selectively coupling the respective gears to the driving shafts is similar in this modification to that above described. It will therefore readily be seen that the log may be given two speeds forward and backward at will, the power chucking mechanism of the lathe forward and backward movement, and the knife carriage quick forward and backward movement, as desired.

The form of Figs. 9 and 10 has several advantages over the modification first described, among which may be mentioned: First, the small intermediate gear 80 is avoided simplifying construction, reducing cost, and increasing reliability; second, the heavy log driving gears at shaft 23 mesh directly with the driving pinions 45ª and 45ᵇ, and the relatively large amount of power required to drive a log is therefore not transmitted through the chuck-driving and quick-feed gears, as in the first modification. In consequence of this arrangement the latter gears may be lighter and the strains and wear on the bearings and other parts are diminished.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

Having described my invention, what I claim as new and desire to secure by Letters Patent, is:

1. In a veneer lathe, in combination, log-driving mechanism, chuck-driving mechanism, and a unitary power-transmitting gear-box for driving both of said mechanisms.

2. In a veneer lathe, in combination, log-driving mechanism, chuck-driving mechanism, a power-transmitting unit for driving both of said mechanisms, and means for operating said unit for varying the drive of said mechanisms.

3. In a veneer lathe, in combination, a log-driving mechanism, chuck-driving mechanism, a quick feed mechanism for the cutting knife of said lathe, driving connections for said mechanisms carried by said lathe and arranged in juxtaposition to each other, and a power-transmitting unit having driving elements arranged in juxtaposition to each other and adapted to co-operate in driving relationship with said driving connections.

4. In a veneer lathe, in combination, a log-driving mechanism, chuck-driving mechanism, a quick feed mechanism for the cutting knife of said lathe, driving connections for said mechanisms carried by said lathe and arranged in juxtaposition to each other, a power-transmitting unit having driving-elements arranged in juxtaposition to each other and adapted to co-operate in driving relationship with said driving connections, and means for operating said unit for varying the drive of said lathe mechanisms.

5. In a veneer lathe, in combination, a shaft for driving a log being operated upon, a driving wheel mounted upon said shaft, a chuck-operating shaft, a drive wheel mounted upon said chuck-operating shaft and disposed in juxtaposition to said first mentioned wheel, a power-transmission unit having driving wheels disposed in driving co-operation with said first mentioned wheels, and means connected to said unit for imparting forward or backward rotation to said chuck-operating shaft.

6. In a veneer lathe, in combination, a shaft for driving a log being operated upon, a driving wheel mounted upon said shaft, a chuck-operating shaft, a drive wheel mounted upon said chuck-operating shaft and disposed in juxtaposition to said first mentioned wheel, a power-transmission unit having driving wheels disposed in driving co-operation with said first mentioned wheels, means connected to said unit for imparting forward or backward rotation to said chuck-operating shaft, and means connected to said unit for imparting different rotative speeds to said log shaft.

7. In a veneer lathe, in combination, a shaft for driving a log being operated upon, a wheel mounted on said shaft for driving the log, a chuck-operating shaft concentrically mounted with respect to said log driving shaft, a drive wheel mounted upon said chuck-operating shaft, a power-transmission unit having driving wheels disposed in driving co-operation with said first mentioned wheels, and means associated with said unit for varying the movements transmitted to said shafts.

8. In a veneer lathe, in combination, a shaft for driving the log being operated upon, a wheel mounted on said shaft for driving the log, a chuck-operating shaft concentrically mounted with respect to said log-driving shaft, a drive wheel mounted upon said chuck-operating shaft, a power-transmission unit having driving wheels disposed in driving co-operation with said first mentioned wheels, and clutch-controlled mechanisms associated with said unit for varying the movements transmitted to said shafts.

9. In a veneer lathe, in combination, a shaft for driving the log being operated upon, a wheel mounted on said shaft for driving the log, a chuck-operating shaft, a drive wheel mounted upon said chuck-operating shaft, a power-transmission unit having wheels disposed in driving co-operation with said first mentioned wheels, and a plurality of gear trains for transmitting power to said driving wheels.

10. In a veneer lathe, in combination, a shaft for driving the log being cut into veneer, a wheel mounted on said shaft for driving the log, a second operative shaft for said lathe, a power-transmission unit having driving wheels dispoed in driving co-operation with said shafts, a plurality of gear-trains operatively connected to transmit power to said driving wheels, and means co-operating with said gear-trains for varying the movement transmitted to said driving wheels.

11. In a veneer lathe, in combination, a shaft for driving the log being cut into veneer, a wheel mounted on said shaft for driving the log, a second operative shaft for said lathe, a power-transmission unit having driving wheels disposed in driving co-operation with said shafts, a plurality of gear-trains operatively connected to transmit power to said driving wheels, means co-operating with said gear-trains for varying the movement transmitted to said driving wheels, and a single drive shaft having gears co-operating with said gear-trains.

12. In a veneer lathe, in combination, a shaft for driving the log being operated upon, a wheel mounted on said shaft for driving the log, a chuck-operating shaft, a drive wheel mounted upon said chuck-operating shaft, a power-transmission unit having driving wheels disposed in driving co-operation with said first mentioned wheels, a plurality of gear trains, and clutch mechanism arranged to co-operate alternately with said gear-trains to vary the movement transmitted to said driving wheels.

13. A power transmission unit for lathes, including in combination, a shaft having a connection for transmitting power to the log drive of the lathe, a shaft having a connection for transmitting power to the dogging mechanism of the lathe, and a single drive shaft for the power-transmission unit for transmitting power to both of said shafts.

14. A power transmission unit for lathes, including in combination, a shaft having a connection for transmitting power to the log drive of the lathe, a shaft having a connection for transmitting power to a second operative mechanism of the lathe, intermeshing gears on said shafts, and a drive shaft for the power-transmission unit having a gear meshing with the gear of said first mentioned shaft.

15. A power transmission unit for lathes, including in combination, a shaft having a connection for transmitting power to the log drive of the lathe, a shaft having a connection for transmitting power to the dogging mechanism of the lathe, a drive shaft for the power-transmission unit for transmitting power to both of said shafts, and means for varying the movements transmitted to said shafts.

16. A power transmission unit for lathes, including in combination, a shaft having a connection for transmitting power to the log drive of the lathe, a shaft having a connection for transmitting power to a second operative mechanism of the lathe, intermeshing gears on said shafts, a drive shaft for the power-transmission unit having a gear meshing with the gear on said first mentioned shaft, and means for varying the movements transmitted to said shafts.

17. In a veneer lathe, the combination with a plurality of operative elements adapted to be driven for performing operations on logs and the like, of a power transmission unit having members including shafts adapted to drive said operative elements, intermeshing gears on said shafts, a power driven shaft having gears arranged to engage with said intermeshing gears, and means for varying the movements transmitted to said shafts.

18. In a veneer lathe, the combination with a plurality of operative elements adapted to be driven for performing operations on logs and the like, of a power transmission unit having members including shafts adapted to drive said operative elements, a train of intermeshing gears at each end of said shafts, a power driven shaft having gears arranged to engage with each of said trains, and means for selectively driving said shafts from said trains.

19. In a veneer lathe, the combination with a plurality of operative elements adapted to be driven for performing operations on logs and the like, of a power transmission unit having members including shafts adapted to drive said operative elements, a train of intermeshing gears at each end of said shafts, a power driven shaft having gears arranged to engage with a gear in each of said trains, and means adapted to rotate with said shafts arranged to be moved selectively into frictional engagement with the respective gears in each of said trains.

20. In a veneer lathe, the combination with a plurality of operative elements adapted to be driven for performing operations on logs and the like, of a power transmission unit having members including shafts adapted to drive said operative elements, intermeshing gears loosely mounted on each of said shafts, a power driven shaft having gears arranged to engage with said intermeshing gears, and clutch mechanism adapted for alternate driving engagement with said gears.

21. In a veneer lathe, the combination with a plurality of operative elements adapted to be driven for performing operations on logs and the like, of a power transmission unit having members including shafts adapted to drive said operative elements, a train of intermeshng gears adapted to run as idlers at each end of said shafts, a power driven shaft provided with a plurality of gears arranged to engage with a gear in each of said trains, clutch mechanisms on each of said shafts adapted to be moved selectively into engagement with said idler gears for driving said shafts respectively therefrom, and operating levers associated with said unit for moving said clutch mechanisms selectively.

22. In a veneer lathe, the combination with a log drive shaft, a chuck driving shaft, and a feed driving shaft for the lathe knife, of a power transmission unit having members arranged for individually driving said shafts, intermeshing gears arranged loosely to revolve on said members, a power driven shaft having gears arranged to engage with said intermeshing gears, and clutch mechanism adapted for alternate driving engagement with said gears.

23. In a veneer lathe, the combination with a chuck driving shaft and a feed driving shaft for the lathe knife, of a power transmission unit having members arranged for individually driving said shafts, intermeshing gears arranged to revolve as idlers on said members, a power driven shaft having gears arranged to engage with said intermeshing gears, and clutch mechanism adapted for alternate driving engagement with said gears.

24. In a veneer lathe, the combination with a chuck driving shaft and a feed driving shaft for the lathe knife, of a power transmission unit having a casing provided with revolving members arranged for driving said shafts, a train of intermeshing gears arranged to run as idlers on said members at each side of said casing, a power driven shaft journaled in said casing provided with a plurality of gears arranged to engage with a gear in each of said trains, and clutch mechanisms on each of said members arranged to be moved into alternate driving engagement with said idler gears.

25. In a veneer lathe, the combination with a chuck driving shaft and a feed driving shaft for the lathe knife, of a power transmission unit having a divided casing and rotatable members journaled in one part and arranged for individually driving said shafts, a train of intermeshing gears adapted to revolve as idlers on said members at each side of said casing, a power driven shaft journaled in said casing and provided with a plurality of gears arranged to engage with a gear in each of said trains, clutch mechanisms on each of said shafts adapted to be moved into alternate driving engagement with said idler gears, and operating levers associated with the other portion of said casing and arranged for selectively moving said clutch mechanisms.

26. In a veneer lathe, in combination, a quick-feed knife-carriage-driving mechanism, chuck-driving mechanism, and a unitary power-transmitting gear-box for driving both of said mechanisms.

27. In a veneer lathe, in combination, a quick-feed knife-carriage-driving mechanism, chuck-driving mechanism, a power-transmitting unit for driving both of said mechanisms, and means for operating said unit for varying the drive of said mechanisms.

28. In a veneer lathe, in combination, a quick-feed knife-carriage-driving mechanism, chuck-driving mechanism, log-driving mechanism, a unitary power-transmitting gear-box, and a driving and driven members forming a part thereof, said latter members being connected with certain of said mechanisms for driving the same.

29. In a veneer lathe, the combination, with a plurality of operative driven elements for treating logs and the like, of a power transmission unit including a driving shaft and driven shafts for driving said operative elements, power-transmitting members mounted upon said shafts and divided into two series of three each, the members of one series cooperating directly with each other, a pair of the members of the second series cooperating directly with each other, and an idler member intermediate and coupling the third member and said pair of members of said second series, and means to selectively clutch certain of said members to their supporting shafts for permitting one of the shafts of said unit to be rotated constantly in one direction, while the other shafts of the same may be selectively rotated in different directions.

30. In a veneer lathe, in combination, a knife-driving mechanism, a chuck-driving mechanism, a power transmission unit for driving both of said mechanisms, said unit including a driving shaft and a plurality of driven shafts, gears secured to said driving shaft, pairs of gears loosely mounted upon each of said driven shafts, the gears of each pair being connected with, and adapted to be driven in opposite directions by, the gears upon said driving shaft, means for locking certain of said gears to their supporting shafts, and means for connecting said shafts with the mechanisms of said lathe.

31. In a veneer lathe, in combination, a knife-driving mechanism, a chuck-driving mechanism, a power transmission unit for driving both of said mechanisms, said unit including a driving shaft and a plurality of driven shafts, gears secured to said driving shaft, pairs of gears loosely mounted upon each of said driven shafts, the gears of each pair being connected with, and adapted to be driven in opposite directions by, the gears upon said driving shaft, coupling members slidably mounted upon each of said driven shafts, clutch portions associated with said coupling members and gears, means for moving said members to engage said clutch portions, said driven shafts being connected with the mechanisms of the lathe.

32. In combination, a veneer lathe, including a knife-carriage movable radially towards and from the work, a gripping chuck movable axially towards and from the work, a common power-driving means for said carriage and said chuck, and power transmission means intermediate said driving means and said carriage and chuck, said transmission means being controllable to effect selective drive of said carriage and chuck in either direction.

33. In combination, a veneer lathe, including a knife-carriage movable radially towards and from the work, a gripping chuck movable axially towards and from the work, a common power-driving means for said carriage and said chuck, and power transmission means including cooperable gears and clutches intermediate said driving means and said carriage and chuck, said transmission means being controllable to effect selective and independent drive of said carriage and chuck in either direction.

34. In combination, a veneer lathe, including a knife-carriage, a gripping chuck, a common power-driving means for said carriage and said chuck, unitary power transmission means intermediate said driving means and said carriage and chuck, and manually-operable control elements for said power transmission means to effect selective drive of said carriage and chuck in either direction.

35. In combination, a veneer lathe, including a knife-carriage radially movable towards and from the work, a gripping chuck movable axially towards and from the work, and a drive member for rotating the work; a common power-driving means for said carriage, said chuck and said member; and power transmission means intermediate said driving means and said carriage, chuck and member and controllable to effect selective drive of said carriage and chuck in either direction and of said member in one direction.

In testimony whereof I affix my signature, in the presence of two witnesses.

LOUIS G. MERRITT.

Witnesses:
H. C. CAIN,
R. J. SMITH.